(12) United States Patent
Abe et al.

(10) Patent No.: US 9,454,300 B2
(45) Date of Patent: Sep. 27, 2016

(54) DEVICE, CONTROL METHOD, AND STORAGE MEDIUM STORING PROGRAM

(75) Inventors: Michiko Abe, Yokohama (JP); Nayu Nomachi, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 555 days.

(21) Appl. No.: 13/425,580

(22) Filed: Mar. 21, 2012

(65) Prior Publication Data

US 2012/0242866 A1    Sep. 27, 2012

(30) Foreign Application Priority Data

Mar. 22, 2011   (JP) ................................. 2011-063324

(51) Int. Cl.
| | | |
|---|---|---|
| G06F 3/0488 | (2013.01) | |
| H04N 5/232 | (2006.01) | |
| H04M 1/725 | (2006.01) | |

(52) U.S. Cl.
CPC ........ *G06F 3/0488* (2013.01); *H04N 5/23212* (2013.01); *H04N 5/23216* (2013.01); *H04M 1/72522* (2013.01); *H04M 2250/52* (2013.01)

(58) Field of Classification Search
None
See application file for complete search history.

(56) References Cited

U.S. PATENT DOCUMENTS

| | | | |
|---|---|---|---|
| 2002/0044162 A1 | 4/2002 | Sawatari | |
| 2004/0207664 A1* | 10/2004 | Anderson | ..................... 345/851 |
| 2005/0012717 A1* | 1/2005 | Park | .............................. 345/163 |
| 2007/0168865 A1* | 7/2007 | Tsutsumi et al. | ............. 715/716 |
| 2009/0040370 A1* | 2/2009 | Varanasi | ...................... 348/376 |

FOREIGN PATENT DOCUMENTS

| | | |
|---|---|---|
| JP | 2002027349 A | 1/2002 |
| JP | 2002-290529 A | 10/2002 |
| JP | 2010-065210 A | 3/2010 |
| JP | 2010-238098 A | 10/2010 |
| JP | 2011-198150 A | 10/2011 |

OTHER PUBLICATIONS

Office Action mailed Oct. 14, 2014, corresponding to Japanese patent application No. 2011-063324, for which an explanation of relevance is attached.

* cited by examiner

*Primary Examiner* — Roberto Velez
*Assistant Examiner* — Yih-Sien Kao
(74) *Attorney, Agent, or Firm* — Hauptman Ham, LLP

(57) ABSTRACT

According to an aspect, a device includes a photographing unit, a display unit, and a control unit. The photographing unit captures an image. The display unit displays the image captured by the photographing unit. The control unit causes the display unit to display an object related to the image captured by the photographing unit so as to be superimposed on the image, and performs a selection process of the object when a body overlaps the object.

12 Claims, 11 Drawing Sheets

```
<virtualInformation>
<latitude>xxxxxx</latitude>
<longitude>yyyyyy</longitude>
<height>zzz</height>
<image>http://example.com/icon.png</image>
<URL>http://example.com/</URL>
</virtualInformation>
```

24b

DEVICE, CONTROL METHOD, AND STORAGE MEDIUM STORING PROGRAM

CROSS-REFERENCE TO RELATED APPLICATIONS

This application claims priority from Japanese Application No. 2011-063324, filed on Mar. 22, 2011, the content of which is incorporated by reference herein in its entirety.

BACKGROUND

1. Technical Field

The present disclosure relates to a device, a control method, and a storage medium storing therein a program.

2. Description of the Related Art

Recently, augmented reality (AR) technology for processing an image of a real space using a computer and adding further information to the image is drawing attention (see, for example, Japanese Patent Application Laid-Open No. 2002-027349). In addition, a technology for selecting information added to an image of a real space and displaying further detailed information is known.

However, if there is a plurality of pieces of information to be added to an image of the real space, the pieces of information to be added may overlap each other. In such a case, it is difficult to select any one of the overlapped pieces of information.

SUMMARY

According to an aspect, a device includes a photographing unit, a display unit, and a control unit. The photographing unit captures an image. The display unit displays the image captured by the photographing unit. The control unit causes the display unit to display an object related to the image captured by the photographing unit so as to be superimposed on the image, and performs a selection process of the object when a body overlaps the object.

According to another aspect, a control method is a method for controlling a device including a photographing unit and a display unit. The control method includes: displaying an object related to an image captured by the photographing unit on the display unit so as to be superimposed on the image; and performing, when a body overlaps the object, a selection process on the object.

According to another aspect, a non-transitory storage medium stores therein a program. When executed by a device which includes a photographing unit and a display unit, the program causes the device to execute: displaying an object related to an image captured by the photographing unit on the display unit so as to be superimposed on the image; and performing, when a body overlaps the object, a selection process on the object.

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone is used to explain as an example of the device; however, the present invention is not limited to mobile phones. Therefore, the present invention can be applied to any type of information processing devices, including but not limited to personal handyphone systems (PHS), personal digital assistants (PDA), portable navigation units, personal computers (including but not limited to tablet computers, netbooks etc.), media players, portable electronic reading devices, and gaming devices.

Figure 1:
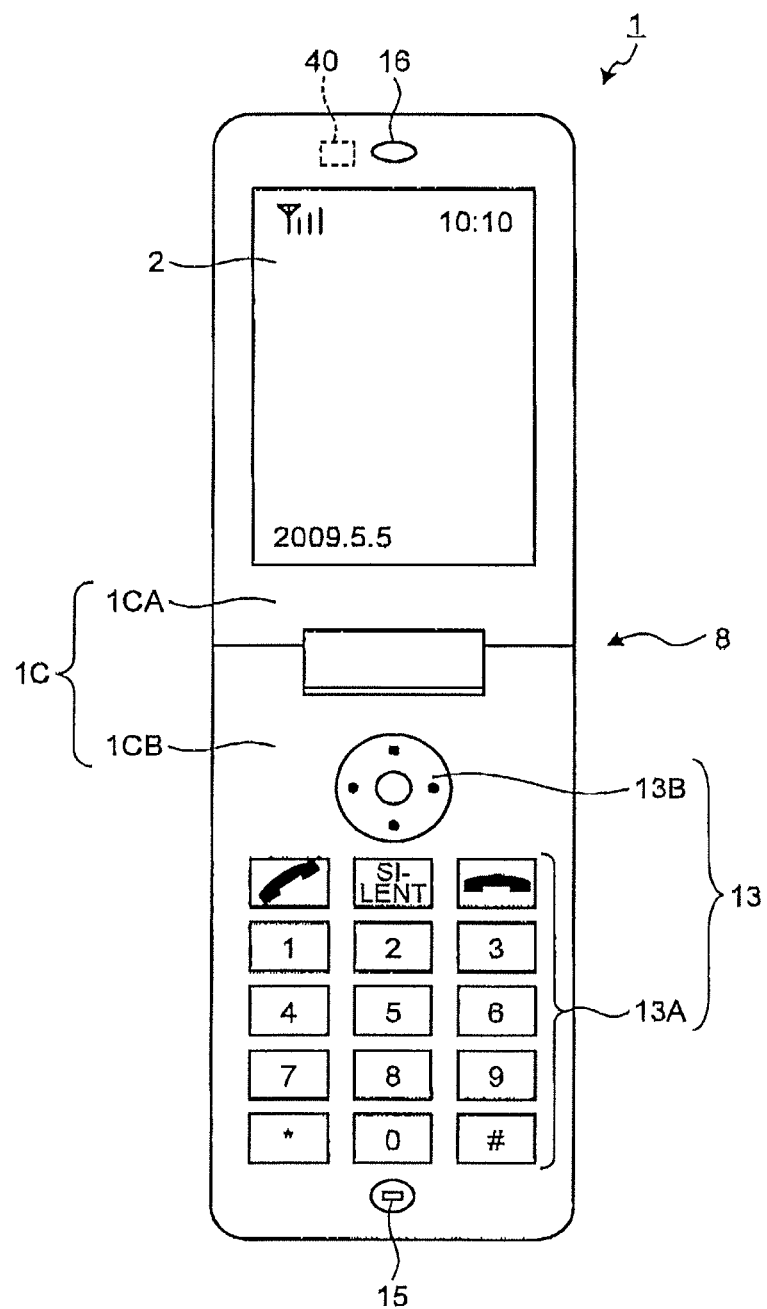
FIG. 1 is a front view of a mobile phone according to an embodiment.

First, an overall configuration of a mobile phone 1 according to a present embodiment will be explained below with reference to FIG. 1. FIG. 1 is a front view of the mobile phone 1. As illustrated in FIG. 1, a housing 1C of the mobile phone 1 includes a first housing 1CA and a second housing 1CB which are coupled to each other by a hinge mechanism 8 so as to be openable and closable. That is, the mobile phone 1 has a folding type housing.

However, the housing of the mobile phone unit 1 is not limited to this configuration. For example, the housing of the mobile phone 1 may be a slide type housing in which both housings are overlapped on each other and one housing and the other housing can be mutually slid from the overlapped state, a rotating type in which one housing is rotated around an axis line along the overlapping direction, or a type in which two housings are connected to each other through a biaxial hinge. The housing of the mobile phone 1 may also be a so-called straight type (slate type) housing that is formed from one housing.

The first housing 1CA includes a display unit 2, a receiver 16, and a photographing unit 40. The display unit 2 is provided with a display device such as a liquid crystal display (LCD) and an organic electro-luminescence display (GELD), and displays various pieces of information such as characters, graphics, and images. The display unit 2 can also display an image captured by the photographing unit 40. The receiver 16 outputs voice of the other party during a phone call.

The photographing unit 40 takes an image by an imaging unit such as an image sensor. An imaging window for guiding light from the outside to the imaging unit of the photographing unit 40 is provided on the opposite side to the face where the display unit 2 of the first housing 1CA is provided. That is, the first housing 1CA is configured so that an image on the back side of the first housing 1CA captured by the photographing unit 40 is displayed on the display unit 2 when a user views the display unit 2 from its front side.

The second housing 1CB includes operation keys 13A including numeric keys and function keys, direction and decision keys 13B so as to perforin selection and decision of a menu and perform scrolling of a screen or the like, and a microphone 15 being a sound acquiring unit that acquires a voice during a phone call. The operation keys 13A and the direction and decision keys 13B constitute the operating unit 13 of the mobile phone 1. The operating unit 13 may include a touch sensor placed over the display unit 2, instead of the operation keys 13A and the like, or in addition to the operation keys 13A and the like.

Figure 2:
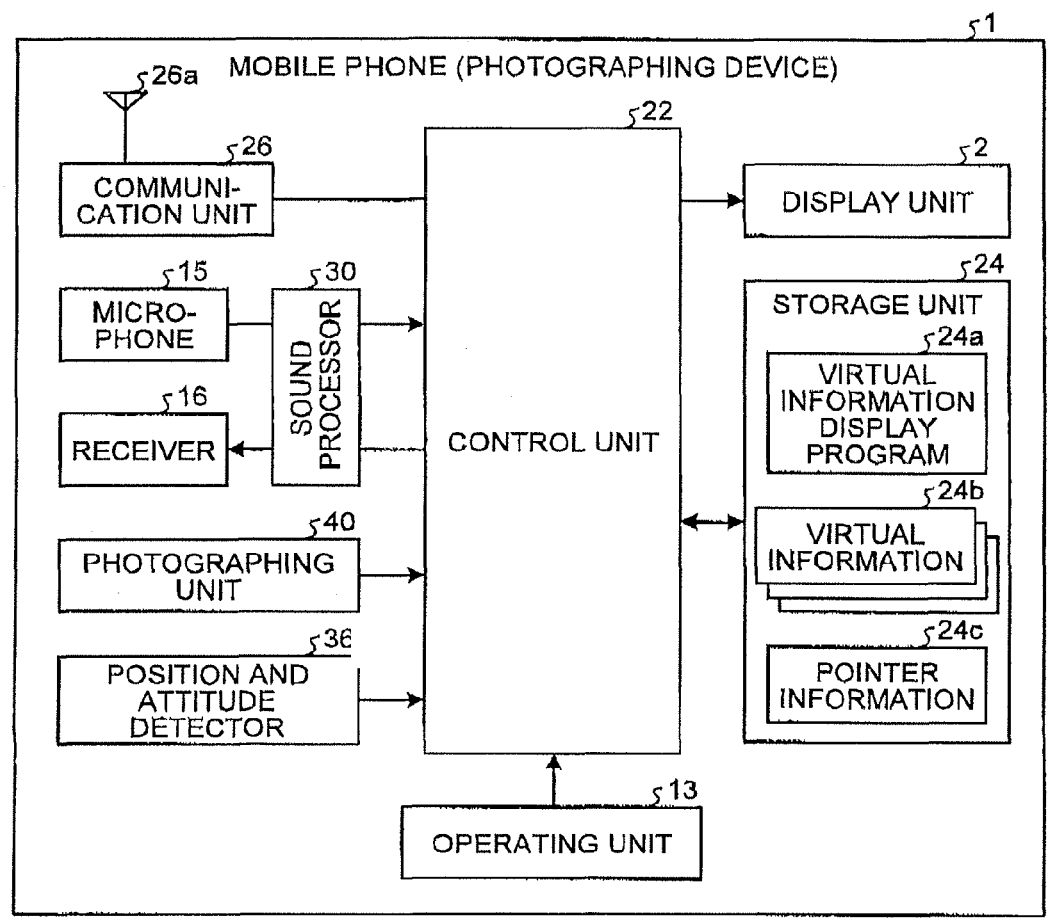
FIG. 2 is a block diagram of the mobile phone.

Next, a functional configuration of the mobile phone 1 is explained with reference to FIG. 2. FIG. 2 is a block diagram of the mobile phone 1. As illustrated in FIG. 2, the mobile phone 1 includes a communication unit 26, the operating unit 13, a sound processor 30, the display unit 2, the photographing unit 40, a position and attitude detector 36, a control unit 22, and a storage unit 24.

The communication unit 26 includes an antenna 26a, and establishes a wireless signal path using a code-division multiple access (CDMA) system, or any other wireless communication protocols, with a base station via a channel allocated by the base station, and performs telephone communication and information communication with the base station. Any other wired or wireless communication or network interfaces, e.g., LAN, Bluetooth, Wi-Fi, NFC (Near Field Communication) may also be included in lieu of or in addition to the communication unit 6. When one of the operation keys 13A or the direction and decision keys 13B is operated by the user, the operating unit 13 outputs a signal corresponding to the content of the operation to the control unit 22.

The sound processor 30 converts sound input from the microphone 15 into a digital signal and outputs the digital signal to the control unit 22. Moreover, the sound processor 30 decodes a digital signal output from the control unit 22 and outputs the decoded signal to the receiver 16. The display unit 2 displays various pieces of information according to a control signal input from the control unit 22. The photographing unit 40 converts a captured image into a digital signal and output the digital signal to the control unit 22.

The position and attitude detector 36 detects a position and an attitude of the mobile phone 1 and outputs a result of detection to the control unit 22. The position and attitude detector 36 detects a position of the mobile phone 1 based on, for example, a global positioning system (GPS) receiver and/or a base station with which the communication unit 26 establish a wireless signal path. In addition, the position and attitude detector 36 detects an attitude of the mobile phone 1 based on, for example, a triaxial acceleration sensor, a direction sensor, and/or a gyro sensor.

The control unit 22 includes a central processing unit (CPU) being a computing unit and a memory being a storage unit, and implements various functions by executing programs using these hardware resources. Specifically, the control unit 22 reads a program and data stored in the storage unit 24 and loads them to the memory, and causes the CPU to execute instructions contained in the program loaded to the memory. The control unit 22 performs read/write of data from/to the memory and the storage unit 24 and controls the operation of the communication unit 26, the display unit 2, or the like according to the execution result of the instructions performed by the CPU. When the CPU executes the instruction, the data loaded to the memory and the signal input from the position and attitude detector 36 or the like are used as parameters.

The storage unit 24 includes one or more non-transitory storage medium, for example, a nonvolatile memory (such as ROM, EPROM, flash card etc.) and/or a storage device (such as magnetic storage device, optical storage device, solid-state storage device etc.), and stores therein programs and data used for processes performed by the control unit 22. The programs and the data stored in the storage unit 24 include a virtual information display program 24a, one or more pieces of virtual information 24b, and a pointer information 24c. The storage unit 24 may be configured by combining a nonvolatile portable storage medium such as a memory card and optical disc with a reader/writer that performs read/write of data from/to the storage medium. In this case, the program and the data that are supposed to be stored in the storage unit 24 are stored in the portable storage medium. The program and the data that are supposed to be stored in the storage unit 24 may be acquired from other device such as a server through wireless communication performed by the communication unit 26.

The virtual information display program 24a provides a function of displaying virtual information corresponding to a real facility or a real material thing on the display unit 2 so as to be superimposed on a real image captured by the photographing unit 40, based on the AR technology. Specifically, the virtual information display program 24a causes control unit 22 to acquire the virtual information 24b corresponding to a facility or a material thing within a photographing range of the photographing unit 40 based on the position, the attitude, or the like detected by the position and attitude detector 36. Then, the virtual information display program 24a causes the display unit 2 to display an object called "AR tag" corresponding to the acquired virtual information 24b on the display unit 2 so as to be superimposed on the image.

The virtual information display program 24a also provides a function of causing the user to select an arbitrary AR tag by using a predetermined body (hereinafter, "pointer") to select an AR tag, and a function of executing an operation associated with the selected AR tag. The pointer is, for example, a finger, a pen, and a pointer stick. The virtual information display program 24a allows the user to select an arbitrary AR tag even if a plurality of AR tags are overlapped on one another.

Figure 3:
FIG. 3 is a diagram illustrating an example of virtual information.

The virtual information 24b stores information for the AR tag to be displayed so as to be superimposed on the image captured by the photographing unit 40. FIG. 3 is a diagram illustrating an example of the virtual information 24b. As illustrated in FIG. 3, the virtual information 24b contains entries such as a latitude, a longitude, a height, an image, and a uniform resource locator (URL). The latitude, the longitude, and the height represent a position of a real facility or a real material thing corresponding to the virtual information 24b. The image represents a substance of the object displayed as an AR tag. The URL represents information associated with the AR tag.

Instead of previously storing all the virtual information 24b as a display target in the storage unit 24, virtual information 24b corresponding to a facility or a material thing in and around the photographing range of the photographing unit 40 may be acquired from a server as needed, based on the position and the attitude of the mobile phone 1. In this case, virtual information 24b of a predetermined amount or of a predetermined number of items may be cached in the storage unit 24. The server mentioned here represents, for example, a device managed by a provider that provides AR services.

The pointer information 24c stores information for detecting a pointer contained in the image captured by the photographing unit 40. The information for detecting a pointer is, for example, a shape and a color of the pointer. In the present embodiment, it is assumed that a user's finger is used as the pointer, and that a shape having a tip with a predetermined angle or less is registered in the pointer information 24c as a shape of a pointer.

Figure 4:
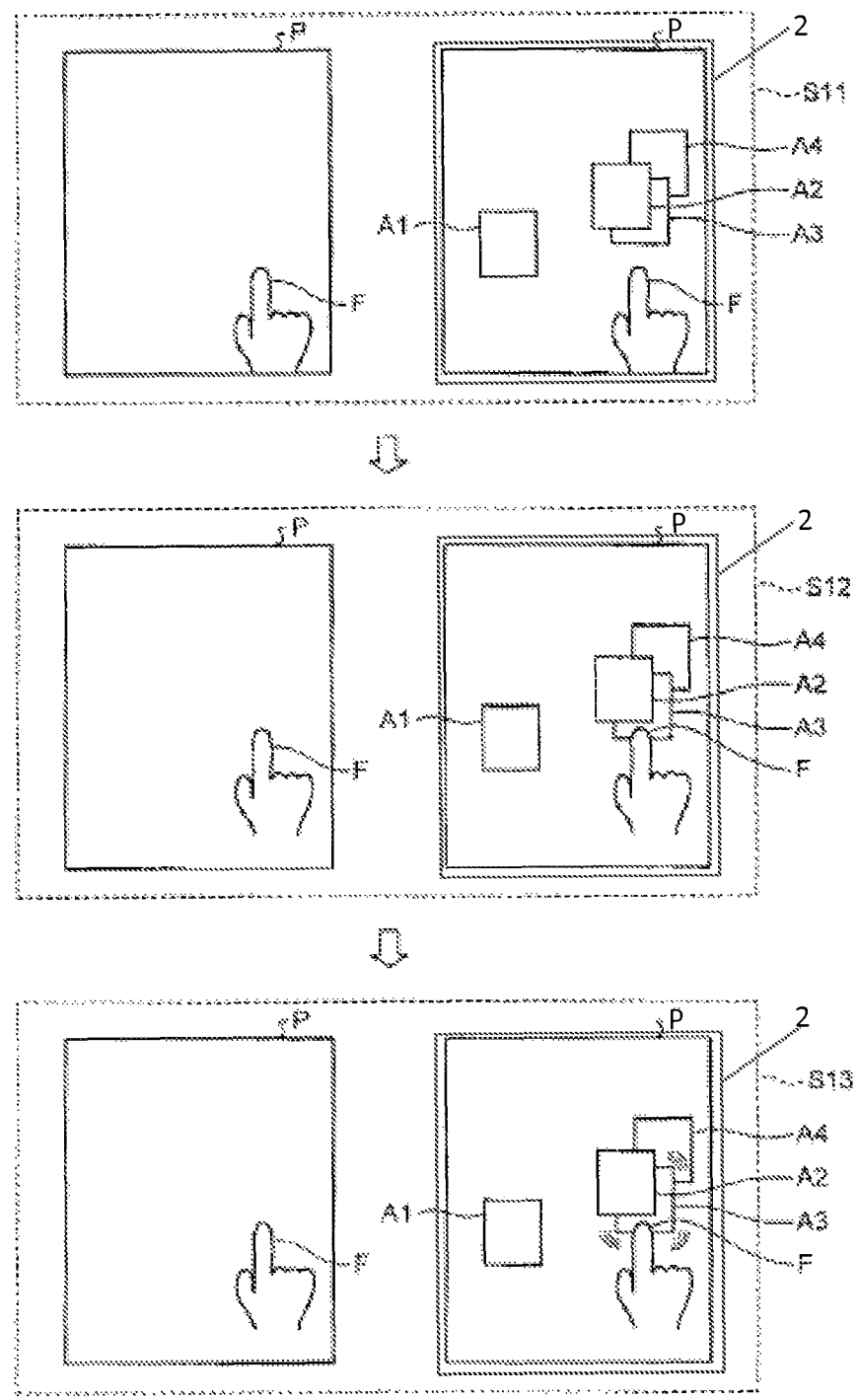
FIG. 4 is a diagram illustrating an example of selecting a first AR tag.
Figure 5:
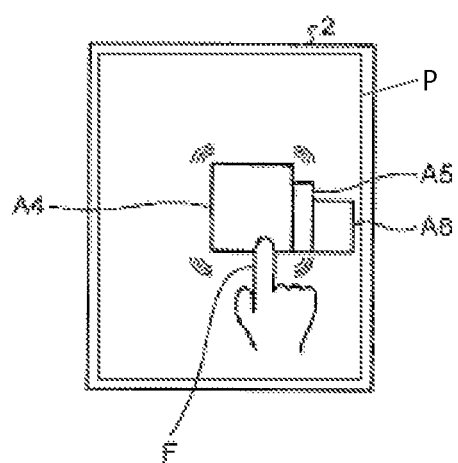
FIG. 5 is a diagram illustrating an example in which there is a plurality of candidates for the first AR tag.
Figure 6:
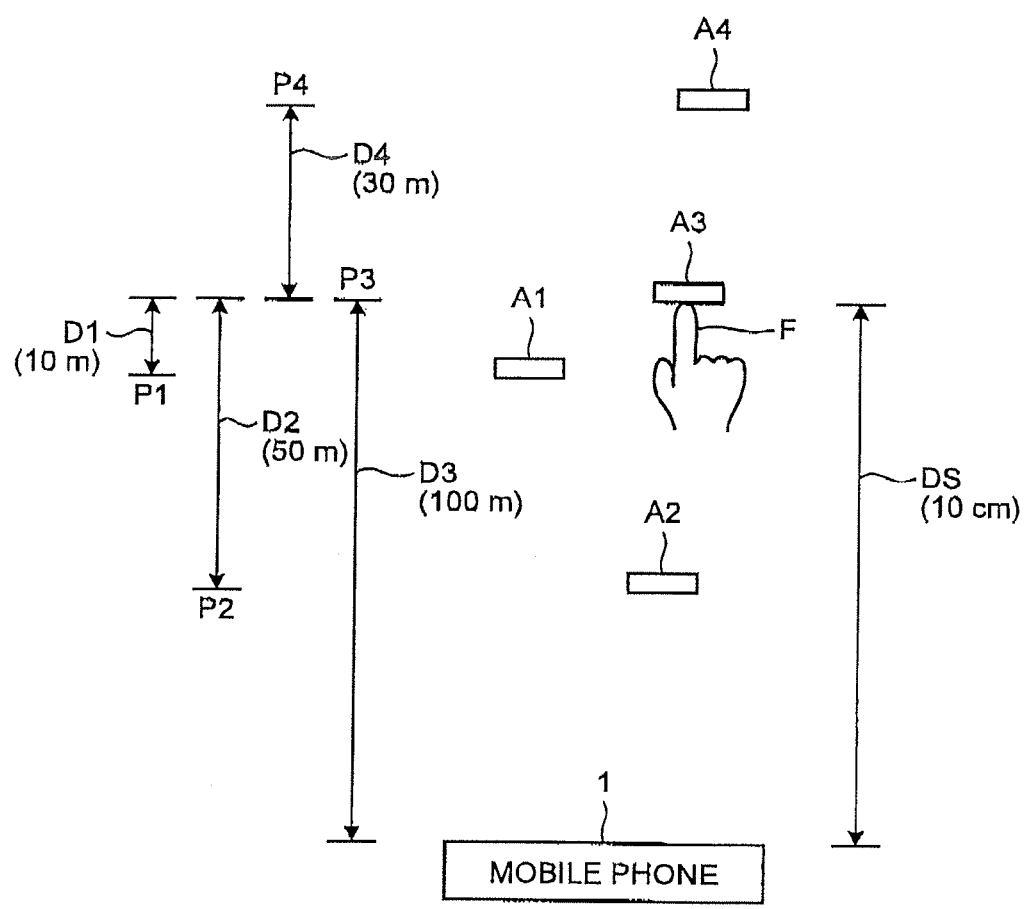
FIG. 6 is a diagram for explaining a reference distance and a conversion factor.
Figure 7:
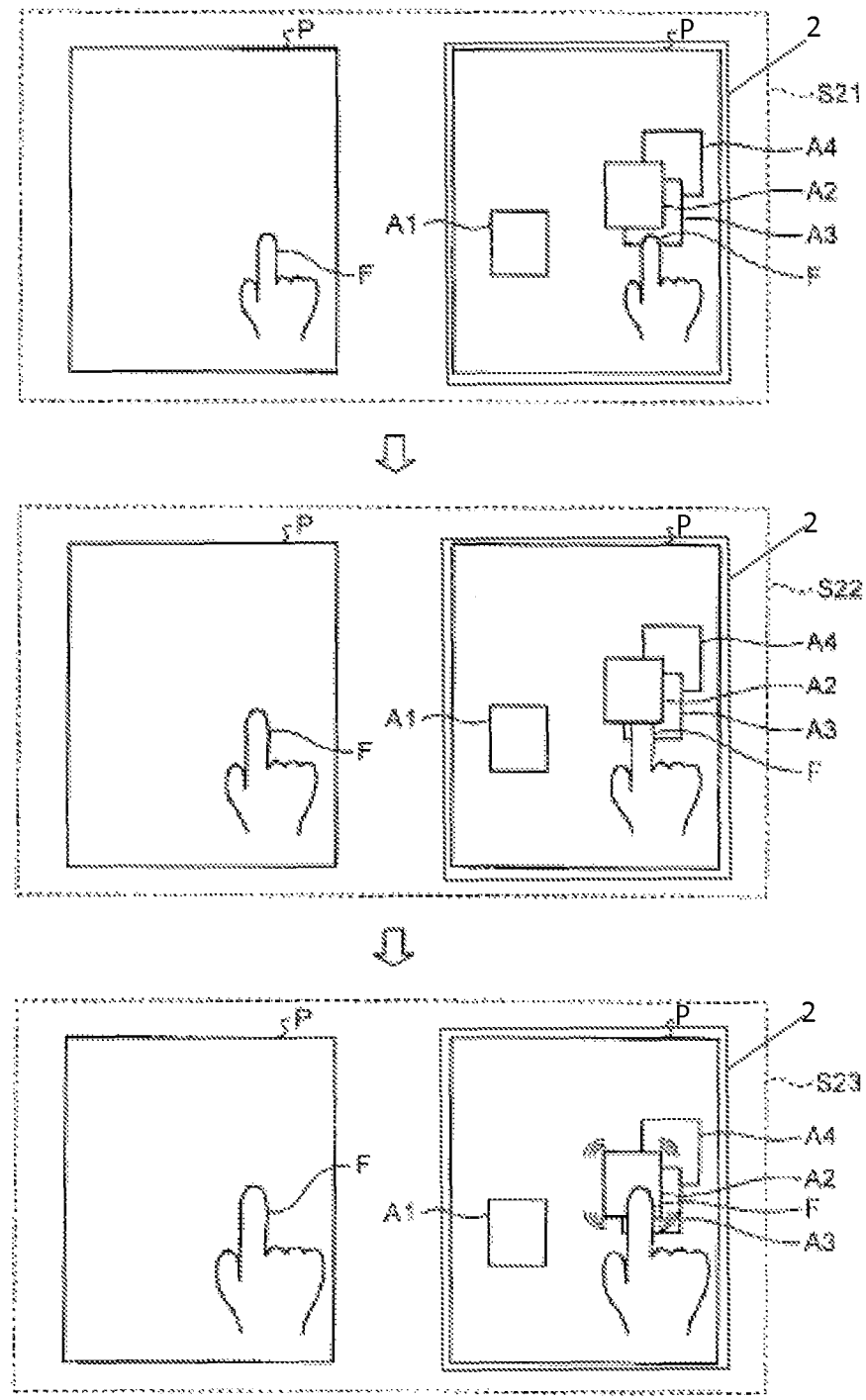
FIG. 7 is a diagram illustrating an example of selecting an AR tag in the front from among overlapped AR tags.
Figure 8:
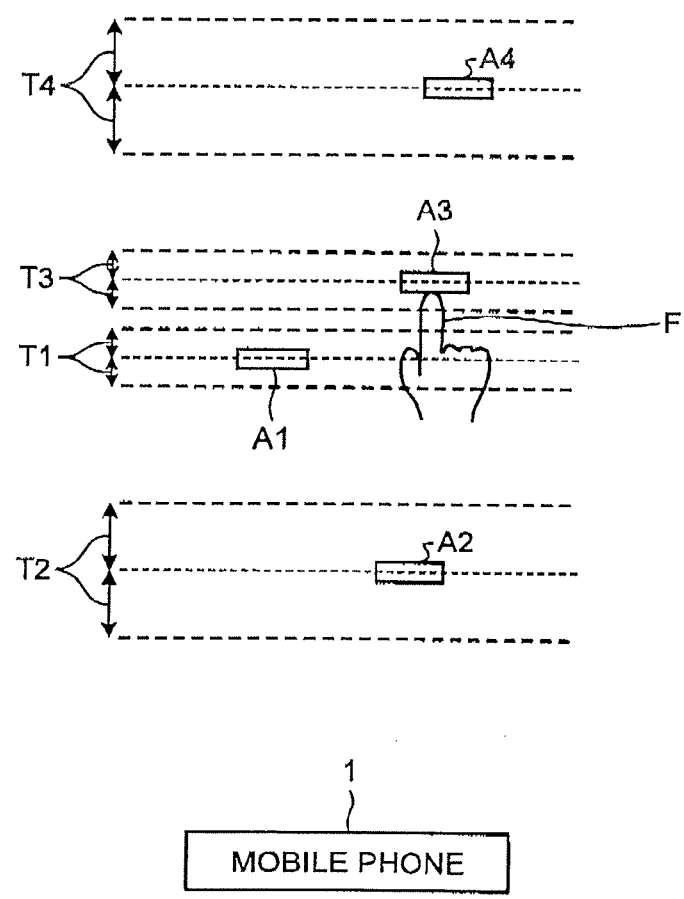
FIG. 8 is a diagram illustrating an example of thresholds to select an AR tag.
Figure 9:
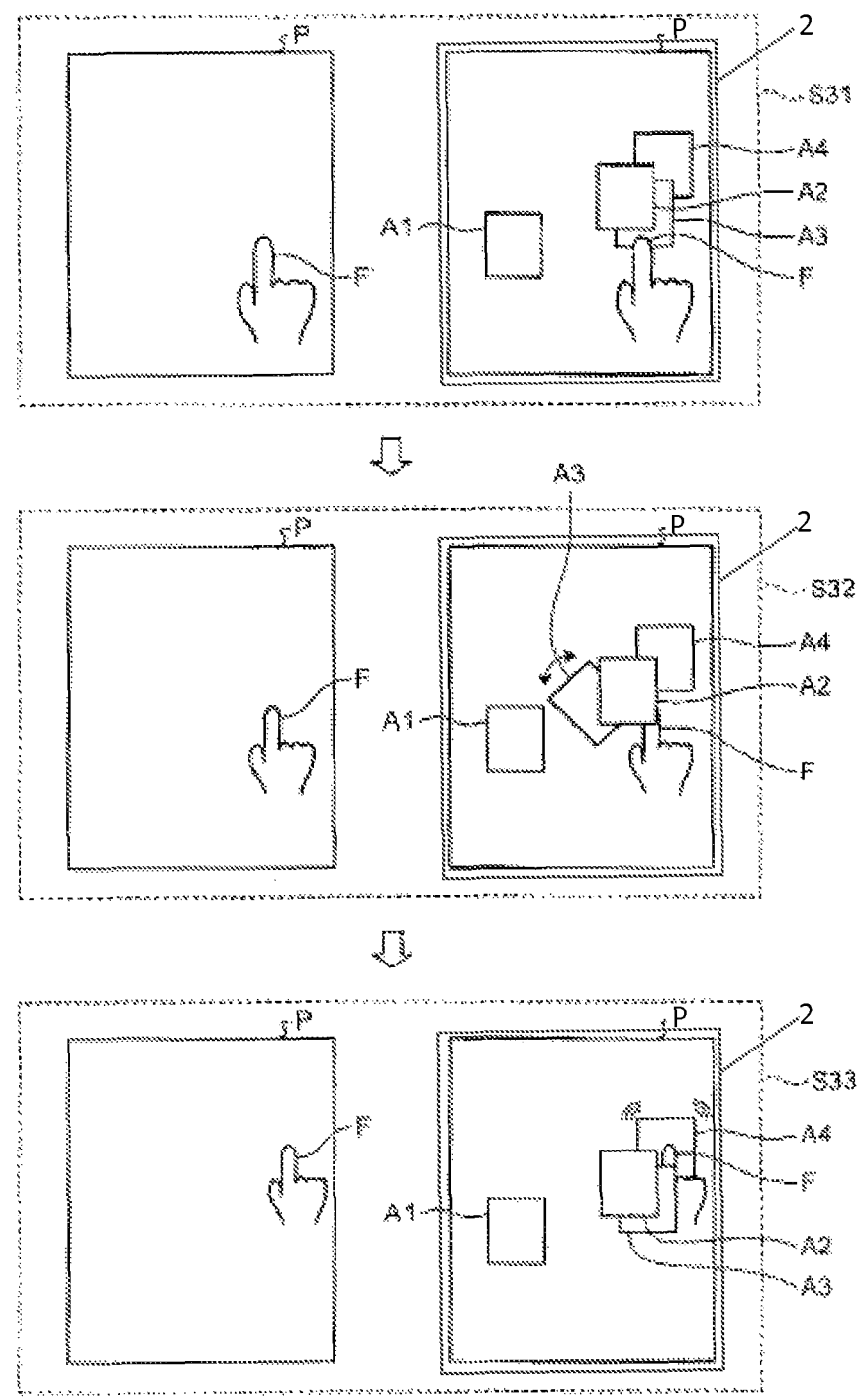
FIG. 9 is a diagram illustrating an example of selecting an AR tag in the back from among overlapped AR tags.

Next, a selection process of an AR tag executed by the control unit 22 based on the function provided by the virtual information display program 24a will be explained below with reference to FIG. 4 to FIG. 9. FIG. 4 is a diagram illustrating an example of selecting a first AR tag. FIG. 5 is a diagram illustrating an example in which there is a plurality of candidates for the first AR tag. FIG. 6 is a diagram for explaining a reference distance and a conversion factor. FIG. 7 is a diagram illustrating an example of selecting an AR tag in the front from among overlapped AR tags. FIG. 8 is a diagram illustrating an example of thresholds to select an AR tag. FIG. 9 is a diagram illustrating an example of selecting an AR tag in the back from among overlapped AR tags.

As illustrated in FIG. 4, the control unit 22 displays an image P captured by the photographing unit 40 on the display unit 2 and checks the image P against the pointer information 24c to try detecting a pointer. When the pointer is detected, the control unit 22 extracts an outline of a shape (for example, the shape of a hand) including the pointer by binarization or the like. If the finger is used as the pointer, detection of the pointer may be tried using, for example, a technology disclosed in Japanese Patent Application Laid-Open No. 2003-346162.

The control unit 22 acquires virtual information 24b corresponding to a facility or a material thing in the photographing range of the photographing unit 40 based on the position and the attitude of the mobile phone 1 detected by the position and attitude detector 36, and displays the AR tag corresponding to the acquired virtual information 24b on the display unit 2 so as to be superimposed on the image P.

Specifically, the control unit 22 calculates a position in the image P captured by the photographing unit 40 to which a position indicated by the acquired virtual information 24b corresponds, and displays the AR tag corresponding to the virtual information 24b at the calculated position. The position in the image P to which the position indicated by the virtual information 24b corresponds is calculated based on the position and the attitude of the mobile phone 1 detected by the position and attitude detector 36, the position information contained in the virtual information 24b, and also based on the size of an imaging area of the photographing unit 40 and the angle of field thereof, and the like.

AR tags each having an area at least a part of which overlaps other tags in the image P are displayed in such a superimposed manner that an AR tag whose position indicated by the corresponding virtual information 24b is nearest to the mobile phone 1 is displayed at the top among the other tags.

At Step S11 illustrated in FIG. 4, because a finger F appears in the image P, by checking the image P against the pointer information 24c, the finger F contained in the image P is detected as a pointer. At Step S11, four AR tags: an AR tag A1 to an AR tag A4 corresponding to facilities and material things in the photographing range of the photographing unit 40 are displayed so as to be superimposed on the image P. The AR tags A2 to A4 overlap one another because the positions indicated by their corresponding pieces of the virtual information 24b are close to each other when viewed from the focus of the photographing unit 40.

In this scene, the finger F being the pointer does not overlap any of the AR tags. When the finger F does not overlap any of the AR tags in this way, no AR tag is selected. Whether the finger F overlaps any of the AR tags is preferably determined by using a tip of the finger F as a reference.

At Step S12, the finger F moves upward, so that the tip of the finger F overlaps an edge of the AR tag A3. When the tip of the finger F overlaps any one of the AR tags for the first time in this manner, the control unit 22 causes the AR tag overlapped by the tip of the finger F to be in a selected state. When any one of the AR tags is caused to be in the selected state, as illustrated at Step S13, the control unit 22 displays the AR tag in the selected state while changing the position thereof many times at short intervals as if it is vibrating. The display of the AR tag in this manner enables the user to easily recognize that the AR tag is selected.

The example of selecting an AR tag overlapped by the finger F for the first time during movement of the finger F from a lower side to an upper side of the image P is represented here; however, when the finger F overlaps any of the AR tags for the first time, the AR tag is caused to be in the selected state, regardless of movement direction of the finger F.

When the tip of the finger F overlaps any of the AR tags for the first time, the shape including the finger F is displayed in the front of the AR tag, as illustrated at Step S12 and Step S13. By controlling the display in this manner, the position of the tip of the finger F is made clear, which makes it easier for the user to recognize which of the AR tags is selected.

When a plurality of AR tags are displayed in a position where the tip of the finger F overlaps an AR tag for the first time, an AR tag displayed in a topmost position, that is, an AR tag whose position indicated by the corresponding virtual information 24b is nearest to the mobile phone 1 may be caused to be in the selected state. For example, as illustrated in FIG. 5, when three AR tags: the AR tag A4, an AR tag 5, and an AR tag 6 are displayed so as to be overlapped on one another in a position where the tip of the finger F first overlaps the AR tag, the topmost AR tag may be caused to be in the selected state. By controlling the display in this manner, an AR tag whose whole image is displayed is more likely to be in the selected state, which makes it easier for the user to recognize which of the AR tags is in the selected state.

When the AR tag overlapped by the tip of the finger F for the first time is caused to be in the selected state in this manner, the control unit 22 measures a distance between the mobile phone 1 and the tip of the finger F at the present time and stores the measured distance as a reference distance in the memory. The measurement of the distance between the mobile phone 1 and the tip of the finger F is implemented by, for example, a focusing function used when the photographing unit 40 focuses on a target. However, the distance between the mobile phone 1 and the tip of the finger F may be measured by using, for example, a distance sensor that measures a distance using infrared rays and/or ultrasonic waves, or may be calculated based on a ratio between the size of the finger F previously stored in the pointer information 24c in association with a predetermined distance and the size of the finger F in the image P.

Subsequently, the control unit 22 calculates a distance between the position of the mobile phone 1 detected by the position and attitude detector 36 and the position indicated by the virtual information 24b corresponding to the AR tag in the selected state. Then, the control unit 22 calculates a conversion factor used to convert a distance in a depth direction between the position indicated by the virtual information 24b in the selected state and a position indicated by another virtual information 24b into a distance along which the tip of the finger F moves, based on the calculated two distances.

As illustrated in FIG. 6, when the reference distance is set as DS and a distance between a position P3 indicated by the virtual information 24b corresponding to the AR tag A3 in the selected state and the mobile phone 1 is set as D3, then the conversion factor is DS/D3. Using the conversion factor allows a relative position in the depth direction between AR tags based on the AR tag A3 to correspond to the position of the finger F.

For example, if DS is 10 cm, that is, 0.1 m, and if D3 is 100 m, then the conversion factor becomes 0.001. In this case, if a position P2 indicated by the virtual information 24b corresponding to the AR tag A2 is located in the front side 50 m from the position P3, then a position in which the finger F is moved forward 50×0.001 m, that is, 5 cm is a position of the AR tag A2 in the depth direction.

Likewise, if a position P1 indicated by the virtual information 24b corresponding to the AR tag A1 is located in the front side 10 m from the position P3, then a position in which the finger F is moved forward 10×0.001 m, that is, 1 cm is a position of the AR tag A1 in the depth direction. If a position P4 indicated by the virtual information 24b corresponding to the AR tag A4 is located 30 m behind the position P3, then a position in which the finger F is moved backward 30×0.001 m, that is, 3 cm is a position of the AR tag A4 in the depth direction.

In this manner, by making the relative position between the AR tags in the depth direction correspond to the position of the finger F, any one of the AR tags displayed on the image P in a superimposed manner can be arbitrarily selected by moving the position of the finger F in the depth direction.

The conversion factor, which is calculated based on the reference distance and the distance between the position indicated by the virtual information 24b corresponding to the AR tag in the selected state and the mobile phone 1, is used here as it is; however, the conversion factor may be arbitrarily adjusted for using. For example, because a distance such that the finger F can be separated from the mobile phone 1 is thought to be about 1 m at most, the magnitude of the conversion factor may be adjusted so that the position of a farthest AR tag in the depth direction falls within this range.

At Step S21 to Step S23 illustrated in FIG. 7, the finger F in the image P is gradually moving forward, and reaches the position of the AR tag A2 in the depth direction at Step S23, where the tip of the finger F overlaps the AR tag A2. In this way, when the tip of the finger F overlaps any one of the AR tags, and when the position of the AR tag in the depth direction and the position of the tip of the finger F in the depth direction coincide with each other, the control unit 22 causes the AR tag to be in the selected state. The control unit 22 then displays the AR tag in the selected state while changing its position many times at short intervals as if it is vibrating.

Determination as to whether the position of the AR tag in the depth direction and the position of the tip of the finger F in the depth direction coincide with each other does not need to be strict. In other words, as illustrated in FIG. 8, a threshold is set for each AR tag, and if the position of the tip of the finger F in the depth direction is within a range of the threshold from the position of the AR tag in the depth direction, then it is considered that the position of the AR tag in the depth direction and the position of the tip of the finger F in the depth direction coincide with each other.

In this case, as illustrated in a threshold T1 of the AR tag A1 and a threshold T3 of the AR tag A3, a threshold of an AR tag close to another AR tag in the depth direction may be made small, while, as illustrated in a threshold T2 of the AR tag A2 and a threshold T4 of the AR tag A4, a threshold of an AR tag apart from another AR tag may be made large. Setting the thresholds in the above manner enables to achieve a balance between ease of selecting an AR tag and prevention of erroneous selection.

In addition, it is difficult to detect whether the finger F moves in the depth direction, depending on an angle of the finger F, and, therefore, if the position of the finger F on the image P remains at a certain location for a given period of time or longer, it may be considered that the finger F is moving in the depth direction at a predetermined speed.

At Step S31 to Step S33 illustrated in FIG. 9, the finger F in the image P is gradually moving backward, and reaches the position of the AR tag A4 in the depth direction at Step S33, where the tip of the finger F overlaps the AR tag A4. In this case, the tip of the finger F overlaps the AR tag A4, and the position of the AR tag A4 in the depth direction and the position of the tip of the finger F in the depth direction coincide with each other, and therefore the control unit 22 causes the AR tag A4 to be in the selected state. The control unit 22 then displays the AR tag A4 in the selected state while changing its position many times at short intervals as if it is vibrating.

As illustrated at Step S32, the control unit 22 temporarily moves the AR tag A3 so as to avoid the tip of the finger F when the tip of the finger F is moving from the front side of the AR tag A3 to the back side thereof. A timing of the movement is defined as a time at which the tip of the finger F is located at a farther position than the position of the AR tag when viewed from the mobile phone 1. When the threshold is set in the AR tag, the timing may be defined as a time at which the tip of the finger F is located at a farther position than the range of thresholds. In this manner, by temporarily moving the AR tag so as to avoid the finger F when the finger F is passing through the AR tag in the depth direction, a point which the position of the finger F in the depth direction reaches can be represented to the user. In addition, such a display effect is suitable for the user to intuitively recognize the position of the finger F because the finger F looks as if it proceeds through the AR tags.

As illustrated at Step S33, when the positions of the AR tag A2 and the AR tag A3 in the depth direction are in the front of the position of the tip of the finger F in the depth direction, the control unit 22 displays the AR tag A2 and the AR tag A3 in the front of the finger F. By changing the order of displaying the AR tags and the finger F in a superimposed manner according to the positions in the depth direction in this way, a positional relationship between the AR tags and the finger F in the depth direction can be visually represented to the user.

Figure 10:
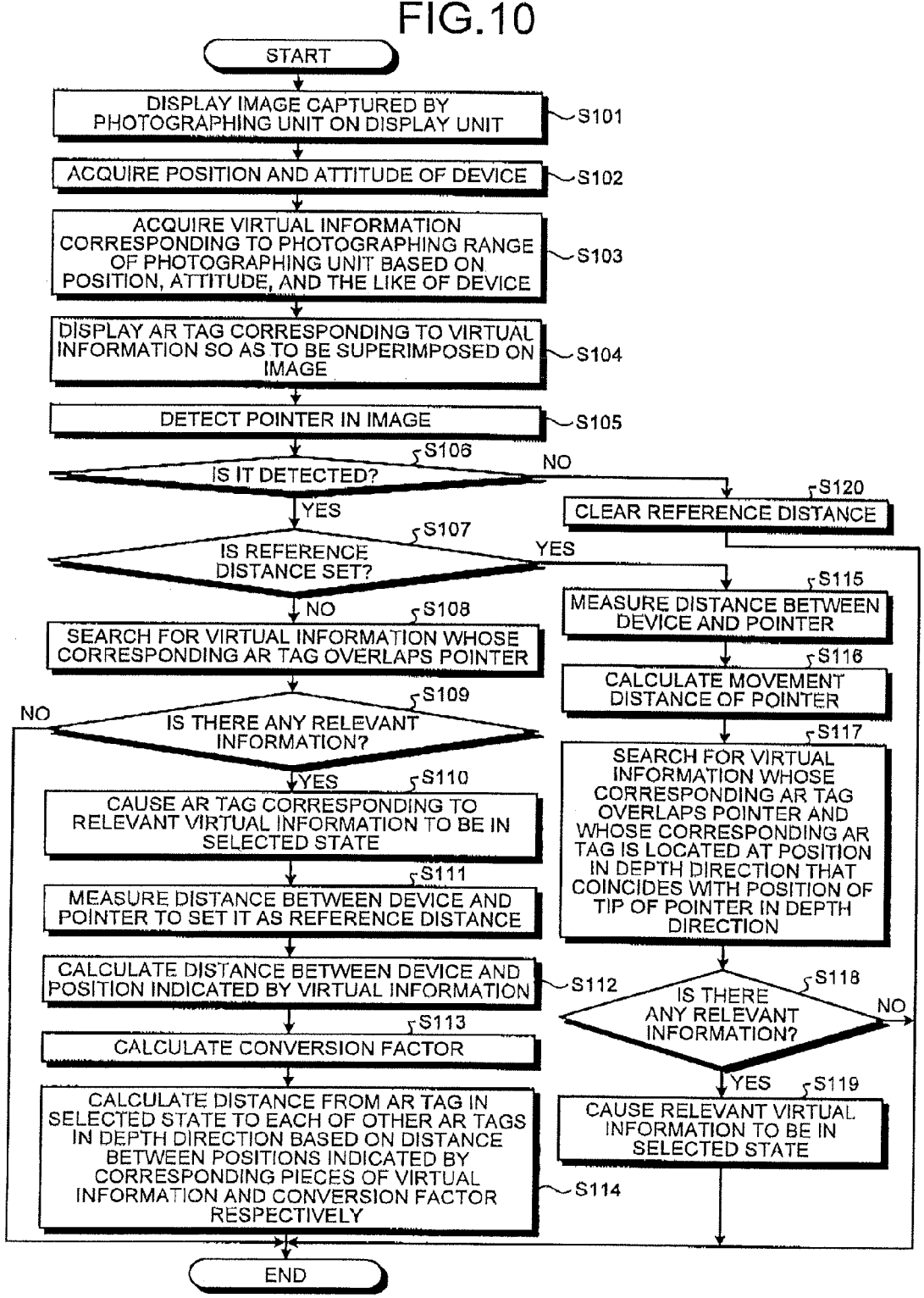
FIG. 10 is a flowchart of a procedure of an AR-tag selecting process by the mobile phone terminal.
Figure 11:
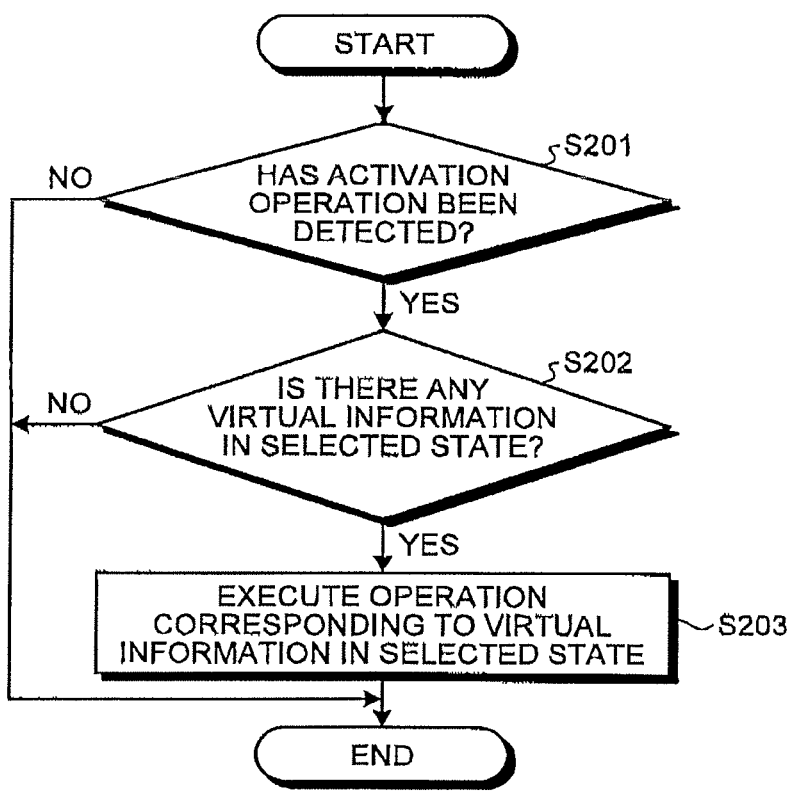
FIG. 11 is a flowchart of a procedure of an AR-tag corresponding operation executing process by the mobile phone terminal.

Next, the operation of the mobile phone 1 will be explained below with reference to FIG. 10 and FIG. 11. FIG. 10 is a flowchart of a procedure of an AR-tag selecting process by the mobile phone 1. FIG. 11 is a flowchart of a procedure of an AR-tag corresponding operation executing process by the mobile phone 1. The procedures illustrated in FIG. 10 and FIG. 11 are repeatedly executed in parallel until the user performs a predetermined end operation after the virtual information display program 24a is activated. The AR-tag selecting process and the AR-tag corresponding operation executing process are implemented through execution of the virtual information display program 24a by the control unit 22.

As illustrated in FIG. 10, first, the control unit 22 displays the image P captured by the photographing unit 40 on the display unit 2, at Step S101. Then, the control unit 22 causes the position and attitude detector 36 to acquire a position and an attitude of the mobile phone 1, at Step S102.

At Step S103, the control, unit 22 acquires virtual information 24b corresponding to the photographing range of the photographing unit 40 based on the position, the attitude, and the like of the mobile phone 1. The control unit 22 displays the AR tag corresponding to the acquired virtual information 24b on the display unit 2 so as to be superimposed on the image P, at Step S104.

At Step S105, the control unit 22 detects a pointer in the image P. When the pointer in the image P is detected (Yes at Step S106), the control unit 22 determines whether the reference distance is set, at Step S107. When the reference distance is not set (No at Step S107), the control unit 22 searches for any virtual information 24b whose corresponding AR tag overlaps the tip of the pointer, at Step S108. When there is no relevant virtual information 24b, that is, when the tip of the pointer does not overlap any of the AR tags (No at Step S109), the control unit 22 does not perform any more particular process.

Meanwhile, when the relevant virtual information 24b is found, that is, when the tip of the pointer overlaps any of the AR tags (Yes at Step S109), the control unit 22 causes the AR tag corresponding to the relevant virtual information to be in the selected state, at Step S110. The control unit 22 measures a distance between the mobile phone 1 and the tip of the pointer and sets the measured distance as the reference distance, at Step S111.

At Step S112, the control unit 22 calculates a distance between the position indicated by the virtual information 24b corresponding to the AR tag in the selected state and the mobile phone 1, and calculates a conversion factor based on the calculated distance and the reference distance, at Step S113. At Step S114, the control unit 22 calculates a distance from the AR tag in the selected state to each of other AR tags in the depth direction based on the distance between positions indicated by corresponding pieces of virtual information 24b and the conversion factor respectively.

When the reference distance is set at Step S107 (Yes at Step S107), the control unit 22 measures a distance between the mobile phone 1 and the tip of the pointer, at Step S115. The control unit 22 then calculates a difference between the measured distance and the reference distance, that is, a movement distance of the pointer, at Step S116.

At Step S117, the control unit 22 searches for virtual information whose the corresponding AR tag overlaps the tip of the pointer and whose the corresponding AR tag is located at a position in the depth direction that coincides with a current position of the tip of the pointer in the depth direction. When the relevant virtual information 24b is found (Yes at Step S118), the control unit 22 causes the AR tag corresponding to the relevant virtual information to be in the selected state, at Step S119. When there is no relevant virtual information (No at Step S118), the control unit 22 does not perform any more particular process.

When the pointer in the image P has not been detected (No at Step S106), the control unit 22 clears the reference distance so as to enable to reset the reference distance, at Step S120. In addition, when the position and the attitude of the mobile phone 1 detected by the position and attitude detector 36 change by predetermined amounts or more, the reference distance may be cleared.

As illustrated in FIG. 11, first, the control unit 22 determines whether an activation operation has been detected, at Step S201. The activation operation is an operation to activate an operation corresponding to an AR tag. The activation operation may be, for example, an operation of pressing any one of the keys in the operating unit 13 and an operation of flicking or pinching an AR tag in the selected state displayed on the display unit 2. In the latter case, the activation operation is detected by analyzing the image P captured by the photographing unit 40.

When the activation operation has been detected (Yes at Step S201), the control unit 22 determines whether there is any virtual information 24b corresponding to the AR tag in the selected state, at Step S202. When there is any virtual information 24b corresponding to the AR tag in the selected state (Yes at Step S202), the control unit 22 executes an operation corresponding to the virtual information 24b, at Step S203. The operation corresponding to the virtual information 24b is, for example, an operation of accessing a uniform resource locator (URL) contained in the virtual information 24b to display a Web page.

When the activation operation has not been detected (No at Step S201), or when there is no virtual information 24b corresponding to the AR tag in the selected state (No at Step S202), the control unit 22 does not perform any more particular process.

As explained above, in the present embodiment, one of the AR tags added to an image can be easily selected.

The aspects of the present invention represented in the embodiments can be arbitrarily modified without departing from the spirit of the present invention. For example, in the embodiments, the process related to selection of an AR tag is executed by the mobile phone 1; however, the process may be executed by a server capable of communication with the mobile phone 1. In this case, the mobile phone 1 transmits the image P captured by the photographing unit 40 and the position and the attitude of the mobile phone 1 detected by the position and attitude detector 36 to the server device, and displays a processed image sent back from the server on the display unit 2.

The advantages of one embodiment of the invention are that one of pieces of information, added to an image can be easily selected.

What is claimed is:

1. A device, comprising:
a photographing unit for capturing an image, the captured image including an image of a physical body;
a display unit for displaying the image, including the image of the physical body, captured by the photographing unit; and
a control unit for
causing the display unit to display a plurality of objects related to the image captured by the photographing unit so as to be superimposed on the image captured by the photographing unit,
when the image of the physical body overlaps one object among the plurality of objects for the first time,
performing a selection of said one object among the plurality of objects, and measuring a distance between the physical body and the device, detecting a change in the distance between the physical body and the device, and selecting another object from among the plurality of objects according to the change in the distance between the physical body and the device.

2. The device according to claim 1, wherein, the control unit is configured to select, when the image of the physical body overlaps multiple objects among the plurality of objects, an object whose relative position is nearest to the image of the physical body.

3. The device according to claim 1, wherein the control unit is configured to calculate the distance between the physical body and the device using a focusing function of the photographing unit.

4. The device according to claim 1, wherein the control unit is configured to calculate the distance between the physical body and the device based on a size of the image of the physical body in the image captured by the photographing unit.

5. The device according to claim 1, wherein the control unit is configured to execute a process corresponding to the selected object according to an operation of the physical body.

6. The device according to claim 1, wherein the control unit is configured to detect the physical body based on previously stored information.

7. The device according to claim 6, wherein the control unit is configured to detect, in the image, a shape having a tip as the image of the physical body.

8. The device according to claim 7, wherein the control unit is configured to determine whether the image of the physical body and the plurality of objects are displayed in a superimposed manner using a position of the tip as a reference.

9. The device according to claim 1, wherein, the control unit is configured to display, when the image of the physical body overlaps an object among the plurality of objects and a distance between the object and the device is smaller than the distance between the physical body and the device, the object in the front of the image of the physical body.

10. The device according to claim 1, wherein each of the plurality of objects is associated with information indicating a position related to the object, and
information related to the object.

11. A control method for a device including a photographing unit and a display unit, the control method comprising:

capturing an image by the photographing unit, the image including an image of a physical body;

displaying the image, including the image of the physical body, captured by the photographing unit on the display unit;

displaying a plurality of objects related to the image captured by the photographing unit on the display unit so as to be superimposed on the image captured by the photographing unit;

when the image of the physical body overlaps one object among the plurality of objects for the first time,
performing a selection of said one object, and
measuring a distance between the physical body and the device; and detecting a change in the distance between the physical body and the device, and selecting another object from among the plurality of objects according to the change in the distance between the physical body and the device.

12. A non-transitory storage medium that stores a program for causing, when executed by a device which includes a photographing unit and a display unit, the device to execute:

capturing an image by the photographing unit, the image including an image of a physical body;

displaying the image, including the image of the physical body, captured by the photographing unit on the display unit;

displaying a plurality of objects related to the image captured by the photographing unit on the display unit so as to be superimposed on the image captured by the photographing unit;

when the image of the physical body overlaps one object among the plurality of objects for the first time,
performing a selection of said one object, and
measuring a distance between the physical body and the device; and detecting a change in the distance between the physical body and the device, and selecting another object from among the plurality of objects according to the change in the distance between the physical body and the device.

* * * * *